United States Patent [19]

Shimizu et al.

[11] Patent Number: 4,678,738
[45] Date of Patent: Jul. 7, 1987

[54] MANUFACTURE OF A WEAR-RESISTANT SLIDING SURFACE

[75] Inventors: Tsutomu Shimizu; Kouji Tarumoto; Satoshi Nanba, all of Hiroshima, Japan

[73] Assignee: Mazda Motor Corporation, Hiroshima, Japan

[21] Appl. No.: 819,681

[22] Filed: Jan. 17, 1986

[30] Foreign Application Priority Data

Jan. 18, 1985 [JP] Japan ................................. 60-8210
Jan. 25, 1985 [JP] Japan ................................ 60-13370

[51] Int. Cl.$^4$ ........................... G03F 7/26; B05D 1/32; B05D 5/08
[52] U.S. Cl. ..................... 430/320; 427/34; 427/259; 427/275; 430/323; 430/324
[58] Field of Search ............... 430/320, 324, 323; 156/659.1; 427/259, 34, 275; 384/279, 902, 912

[56] References Cited

U.S. PATENT DOCUMENTS

| | | | |
|---|---|---|---|
| 2,517,430 | 8/1950 | Heusel et al. | 427/275 X |
| 2,968,555 | 1/1961 | Bendler et al. | 96/38 |
| 4,253,888 | 3/1981 | Kikuchi | 427/35 X |
| 4,378,383 | 3/1983 | Moritz | 427/259 X |

FOREIGN PATENT DOCUMENTS

41-18604 10/1966 Japan .
57-145971 9/1982 Japan .................................. 427/34

OTHER PUBLICATIONS

"Yosha Binran" (Material Spray Handbook), published in 1964 by Nikkan Kogyo Shinbunsha (Daily Industrial Newspaper Co.) pp. 636 to 641.

Primary Examiner—Evan K. Lawrence
Attorney, Agent, or Firm—Fleit, Jacobson, Cohn & Price

[57] ABSTRACT

A process for manufacturing a member having a wear resistant sliding surface. The process includes the steps of providing a metallic substrate having a surface covered by a photo-resist coating, forming the photo-resist coating with a pattern of hard and soft portions, removing the photo-resist coating at the soft portions to expose surface portions of the metallic substrate beneath the soft portions of the photo-resist coating, etching the metallic substrate with the hard portion of the photo-resist coating retained thereon to form pits in the surface portions of the metallic substrate, spraying molten filler material on the surface of the metallic substrate with the hard portion of the photo-resist coating thereon, to fill the pits with the filler material of a porous structure having an oil-retaining capability, and removing the hard portion of the photo-resist coating from the metallic substrate.

8 Claims, 4 Drawing Figures (a)

(b)

(c)

(d)

(a)

(b)

(c)

(d)

(e)

MANUFACTURE OF A WEAR-RESISTANT SLIDING SURFACE

BACKGROUND OF THE INVENTION

1. Field of the Invention

The present invention relates to a process for manufacturing a member having a sliding surface with a wear-resistant property, such as a cylinder liner for internal combustion engines.

2. Description of the Prior Art

Conventional internal combustion engines have cylinder blocks formed with cylinder bores in which pistons are disposed for slidable reciprocating movements. In each of the cylinder bores, there is a cylinder liner having an inner cylindrical surface which is adapted to be slidably engaged with the piston. Hithertofore, tremendous efforts have been made to improve the wear-resistant property of the sliding surface in the cylinder liner. It has been recognized that it is effective to improve the wear-resistant property by providing the sliding surface with pits for retaining lubricant oil. It has also been recognized that the quantity of the lubricant oil maintained in the pits is increased in response to an increase in the area ratio of the pits, that is, the ratio of the overall area of the pits to the area of the sliding surface. It should, however, be noted that a simple increase in the area ratio of the pits is not recommendable from the viewpoint of improving the wear-resistant property because the area of the plateaus is correspondingly decreased, causing an increase in the contact pressure in a unit area.

It is possible to increase the quantity of the lubricant oil retained in the pits without increasing the area ratio. For that purpose, the pits may be increased in depth but not in the area of the openings. However, the conventional reverse current process adopted for providing a porous plating layer is not suitable for increasing the depth of the pits, because an excessive reverse current electrolysis will produce rough surfaces in the plateaus. Photo-etching processes may be suitable for providing relatively deep pits in the sliding surface. The U.S. Pat. No. 2,968,555 issued on Jan. 17, 1961, to H. M. Bendler et al, proposes a process for treating metal surfaces in which the metal surfaces are formed with oil retaining pits through a photo-etching technique.

It should, however, be noted that the pits thus formed in the sliding surface simply retain the lubricant oil so that the lubricant oil retained in the pits is apt to be drawn out by a member which slides on the sliding surface. Since the quantity of the lubricant oil drawn from the pits increases as the sliding speed increases, there is a danger of shortage of lubricant oil depending on the sliding speed.

Improved lubrication will be accomplished by using a self-lubricating material. It has been a common practice to use a cast iron material containing graphites, such as flake graphites, in a member having a sliding surface. It should be noted, however, that in recent high power engines which are operated under a high output and a high speed condition, the sliding surface of the cylinder liner is subjected to a high temperature and a high contact pressure so that the graphites themselves cannot provide a satisfactory lubrication. In view of the problems, it has been proposed to spray a molten ceramic material on the sliding surface to form a wear-resistant layer. However, the ceramic layer thus formed does not have satisfactory durability because the ceramic layer cannot be attached to the substrate with a satisfactory bonding power.

It has also been proposed to provide the sliding surface with a composite plating layer having particles with a self-lubricant property distributed in the surface. However, a complicated process is required to form such a composite plating layer. A proposal has further been made to provide a sliding surface having particles of silicon carbides embedded in the surface through a mechanical process. However, this proposal is not advantageous either, because the process for distributing the silicon carbide particles is complicated and not practical.

SUMMARY OF THE INVENTION

It is therefore an object of the present invention to provide a simple process for producing a sliding surface which provides a satisfactory oil-retaining capability even under a high sliding speed.

Another object of the present invention is to provide a simple and effective process for forming a durable sliding surface having a high oil-retaining capability.

A further object of the present invention is to provide a practical process for forming a sliding surface which can retain lubricant oil even under a high sliding speed.

According to the present invention, the above and other objects can be accomplished by a process comprising the steps of providing a metallic substrate having a surface covered by a photo-resist coating, forming the photo-resist coating with a pattern of at least one hard portion and a plurality of soft portions, removing the photo-resist coating at the soft portions to expose surface portions of the metallic substrate beneath the soft portions of the photo-resist coating, etching the metallic substrate with the hard portion of the photo-resist coating retained thereon to form pits in said surface portions of the metallic substrate, spraying molten filler material on the surface of the metallic substrate with the hard portion of the photo-resist coating retained thereon to fill the pits with the filler material of a porous structure having an oil-retaining capability, and removing the hard portion of the photo-resist coating from the metallic substrate. In a preferred aspect of the present invention, the filler material is molybdenum or chromium-based material. The substrate may be made of cast iron. Where desired, the substrate may be plated at the surface with chromium.

Preferably, the photo-resist coating has the capability of catching the sprayed filler material in the cured condition so that the filler material sprayed on the photo-resist coating is prevented from being dispersed. It is preferable that the pits are filled by the filler material substantially to the surface of the substrate so that a substantially flush surface is formed in the substrate.

The process of the present invention is advantageous in that the area covered by the cured portion of the photo-resist coating is protected against the spray of the filler material. Further, the particles of the sprayed filler material sprayed on the photo-resist coating are captured by the coating so that the particles of the sprayed filler material directed to the pits are not disturbed by movements of the particles which would otherwise be dispersed in random directions by the plateau areas of the substrate. It is also possible to prevent deposits of the filler material on the plateau areas.

The above and other objects and features of the present invention will become apparent from the following descriptions of a preferred embodiment taking reference to the accompanying drawings.

DESCRIPTION OF THE PREFERRED EMBODIMENT

Figure 1:
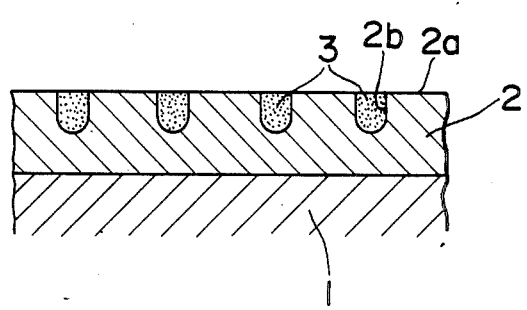
FIG. 1 is a fragmentary sectional view showing a member having a sliding surface made in accordance with one embodiment of the present invention.

Referring to the drawings, particularly to FIG. 1, there is shown a metallic substrate 1, which may be a cylinder liner of an internal combustion engine and made, for example, of an alloy cast iron. The substrate 1 is formed at a surface with a layer of hard metal plating such as a chromium plating layer 2 which provides a sliding surface 2a. The layer 2 is formed at the sliding surface with a plurality of lubricant oil-retaining pits 2b which are formed through a photo-etching process. The pits 2b are distributed throughout the sliding surface 2a and have a substantially U-shaped longitudinal sectional configuration. The portion of the sliding surface 2a other than the pits 2b constitutes a plateau area which slidably engages a cooperating member, such as a piston.

The pits 2b are filled with a filler material 3 of a porous structure which retains lubricant oil. The filler material 3 in the pits 2b can retain lubricant oil even under a high sliding speed so that satisfactory lubrication can be maintained for a prolonged time.

Figure 3:
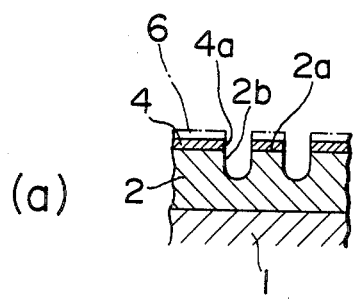
FIG. 3 shows sequential steps of forming a sliding surface in accordance with one embodiment of the present invention.
Figure 3:
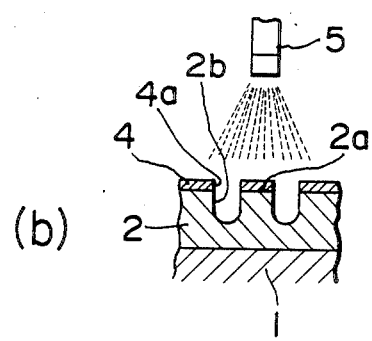
Figure 3:
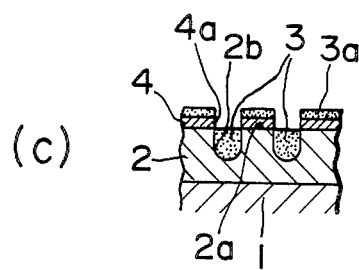
Figure 3:
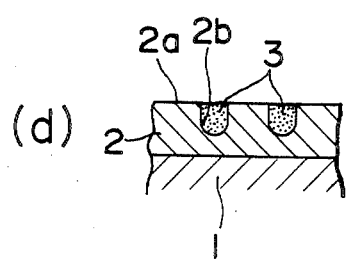

Referring now to FIG. 3, there is shown a process for forming the structure shown in FIG. 1. The substrate 1 having the plating layer 2 is at first ground or honed at the surface of the plating layer 2 to thereby form a sliding surface 2a. The sliding surface 2a is then de-oiled and covered by a photo-resist coating 4, which may be of any known type. For example, the photo-resist coating may be sensitive to ultraviolet rays. Alternatively, the coating may be of such a type that is sensitive to electron beams or X-rays. Then, a mask of a desired pattern is placed on the photo-resist coating 4 as shown by a phantom line 6 in FIG. 3(a). Where the photo-resist material is of such a type that is hardened or cured when it is exposed to the beams or rays to which the material has a sensitivity, the mask is opaque to such beams or rays in areas corresponding to the pits 2b. Where the photo-resist material is of a type that is softened when it is exposed to the sensing beams or rays, the mask is transparent to such beams or rays in the areas corresponding to the pits 2b. It is not necessary to place the mask in direct contact with the surface 2a of the plating layer 2 but it may be positioned with a certain spacing from the surface 2a, and the pattern of the mask may be focused on the surface 2a through an appropriate optical system.

The sensing beams or rays are then projected through the mask to the photo-resist coating 4 so that the photo-resist material in the areas corresponding to the pits 2b is softened or left in the soft state, as the case may be, and the photo-resist material in the other area is left in the hard state or cured. Then, the photo-resist coating 4 is developed by a suitable developing agent, such as trichlorethane, to remove the photo-resist material in the softened areas or in the areas where the material is not cured. Thus, the portions of the plating layer 2 corresponding to the pits 2b are exposed through apertures 4a which are formed by the removal of the photo-resist material.

Thereafter, the plating layer 2 is subjected to an etching treatment to form oil-retaining pits 2b in the plating layer 2 as shown in FIG. 3(a). Then, particles of molten molybdenum or other suitable filler material are sprayed by means of a plasma spray gun 5 toward the pits 2b with the photo-resist coating 4, as shown in FIG. 3(b). A part of the molten particles of the filler material may contact the photo-resist coating 4. Since the photo-resist coating 4 is soft as compared with the plating layer 2, the particles of the filler material are captured by the coating 4 and prevented from being dispersed. Thus, the particles directed to the pits 2b can reach the pits 2b without fail because there are no dispersed particles. The pits 2b are therefore filled with the filler material as shown in FIG. 3(c). The filler material forms deposits 3 of porous structure in the pits 2b. Finally, the photo-resist coating 4 is removed by dipping it into a suitable solution, such as methylene chloride, as shown in FIG. 3(d).

Figure 4:
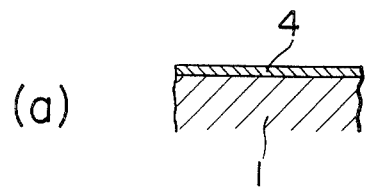
FIG. 4 shows sequential steps of a photoetching process.
Figure 4:
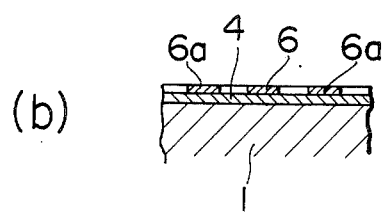
Figure 4:
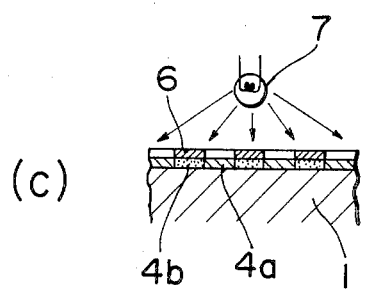
Figure 4:
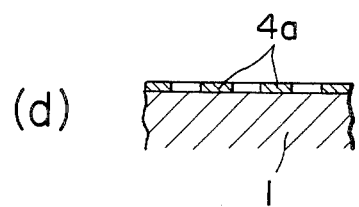
Figure 4:
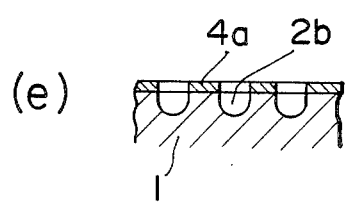

Referring to FIG. 4, there are shown the steps of a photoetching process in which a photo-resist coating 4 is at first formed on the substrate (FIG. 4(a)), and a mask 6 having opaque portions 6a is placed on the coating 4 (FIG. 4(b)). Then, the photo-resist coating 4 is exposed through the mask (FIG. 4(c)) and the mask 6 is removed. Thereafter, a development is carried out to remove unexposed areas 4b leaving the exposed areas 4a only (FIG. 4(d)). The substrate 1 is then subjected to the aforementioned etching process (FIG. 4(e)).

EXAMPLE I

A test piece is prepared as a disc of an alloy cast iron having a surface formed with a hard Cr plating of 50 microns in thickness and 900 to 1000 in hardness on the Vickers scale, the surface of the plating being finished by a No. 1000 honing tool. Oil retaining pits of 20 microns in depth are formed in the surface of the Cr plating layer through the aforementioned photo-etching process, and the pits are filled with porous molybdenum which is sprayed in the molten state toward the pits. Then, the photo-resist coating is removed.

EXAMPLE II

A second test piece is prepared as a disc of an alloy cast iron which is subjected to a photo-etching treatment to form pits distributed in one surface as in the Example I. The pits are then filled with porous chromium carbide which is sprayed toward the pits in a molten state, and the photo-resist coating is removed.

Comparative Test Piece I

The disc of Example I is used after the photo-etching treatment.

Comparative Test Piece II

The disc of Example I is used without the photo-etching treatment.

Comparative Tests

Figure 2:
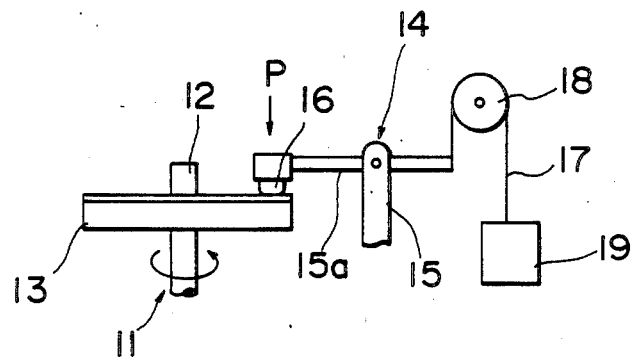
FIG. 2 is a side view of a wear test machine.

The test pieces are subjected to a wear test by a test machine which includes, as shown in FIG. 2, a disc rotating section 11 having a spindle 12 adapted to be driven by a motor (not shown). The test piece 13 is carried by the spindle 12 and rotationally driven. The machine further includes a pin depressing section 14 comprising a sliding pin 16 carried at one end of a lever 15a, which is swingably supported by support post 15. The other end of the lever 15a is connected with one end of a cable 17 which is passed around a pulley 18 and connected at the other end with a weight 19. The pin 16 is therefore depressed, under the influence of the weight 19, against the sliding surface of the test piece 13. The pin 16 is made of a square plate of a chilled alloy cast as shown in Table 1 and has a sliding surface ground by a GC No. 60 grinder to a roughness of 1.6a and finished by shot blasting by No. 20 carborundum shots to a roughness of 10 to 40 microns.

TABLE 1

| (wt %) | | | | | | | | | | | |
|---|---|---|---|---|---|---|---|---|---|---|---|
| C | Si | Mn | P | S | Cr | Cu | Mo | Ni | Mg | V | Fe |
| 3.5 | 2.3 | 0.4 | 0.2 | 0.02 | 0.5 | 1.0 | 1.5 | 1.0 | 0.01 | 0.2 | balance |

Wear Tests

The tests are made in accordance with the following conditions:

| | |
|---|---|
| Depressing Load | P = 4.5 Kg |
| Peripheral Speed of the Disc | 5 m/sec. |
| Test Time | 10 minutes |
| Lubrication | None |

The results are shown in Table II.

TABLE II

| | Wear of Pin (microns) | Scratches on Disc |
|---|---|---|
| Example I | 30 to 50 | Small |
| Example II | 40 to 50 | Small |
| Comp. I | 60 to 70 | Medium |
| Comp. II | 90 to 120 | Large |

Seizure Tests

The tests are made in accordance with the following conditions:

| | |
|---|---|
| Depressing Load | P = 4.5 Kg |
| Peripheral Speed of the Disc | 5 m/sec. |
| Lubrication | A mixture of oil (10 W 40) and kerosene mixed in 1:9 volumetric ratio. The lubricant is applied by sequentially dripping droplets of 1 cc in volume. |

The machine is operated until seizure is observed and the test time is then recorded. The results are shown in Table III.

TABLE III

| | Time until Seizure is observed (Hr) |
|---|---|
| Example I | 2.5 |
| Example II | 3.5 |
| Comp. I | 2.0 |

From the above, it will be understood that the sliding surfaces made in accordance with the present invention have improved wear and seizure-resistant properties as compared with those formed by conventional processes. It should of course be noted that the substrate may have any type of plating. However, a preferable plating may be the one which has a hardness greater than 700 on the Vickers scale.

The invention has thus been shown and described with reference to specific examples, however, it should be noted that the invention is in no way limited to the details of such examples, but changes and modifications may be made without departing from the scope of the appended claims.

We claim:

1. A process for manufacturing a member having a sliding surface, the process comprising the steps of: providing a metallic substrate having a surface covered by a photo-resist coating, forming the photo-resist coating with a pattern of at least one hard portion and a plurality of soft portions, removing the photo-resist coating at the soft portions to expose surface portions of the metallic substrate beneath the soft portions of the photo-resist coating, etching the metallic substrate with the hard portion of the photo-resist coating retained thereon to form pits in said surface portions of the metallic substrate, applying molten filler material by plasma spraying particles of molten filler material onto the surface of the metallic substrate having the hard portion of the photo-resist coating retained thereon, to fill the pits with a porous structure defined by particles of the filler material to provide an oil-retaining capability, and removing the hard portion of the photo-resist coating from the metallic substrate.

2. A process in accordance with claim 1 in which said filler material is molybdenum.

3. A process in accordance with claim 1 in which said filler material is chromium based material.

4. A process in accordance with claim 1 in which said substrate is cast iron.

5. A process in accordance with claim 1 in which said substrate includes a hard plating layer having said surface.

6. A process in accordance with claim 1 in which said pattern is provided by photo mask means.

7. A process in accordance with claim 1 in which said hard portion of the photo-resist coating is capable of capturing particles of sprayed filler material which have been sprayed on said hard portion.

8. A process in accordance with claim 1 in which the pits are filled substantially completely by the filler material.

* * * * *